(12) United States Patent
Vargas

(10) Patent No.: US 7,630,723 B2
(45) Date of Patent: Dec. 8, 2009

(54) METHOD AND APPARATUS TO AUTOMATICALLY SILENCE A MOBILE DEVICE

(75) Inventor: Jose J Araya Vargas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 10/915,292

(22) Filed: Aug. 10, 2004

(65) Prior Publication Data

US 2006/0035649 A1 Feb. 16, 2006

(51) Int. Cl.
*H04Q 7/20* (2006.01)

(52) U.S. Cl. ............... 455/456.4; 455/41.2; 455/552.1; 455/458

(58) Field of Classification Search ............... 455/567, 455/458, 435.1, 41.1–41.3, 67.11, 414.1–414.2, 455/419, 420, 9, 517, 550.1, 456.4, 425, 455/67.7, 68, 552.1, 515, 418
See application file for complete search history.

(56) References Cited

U.S. PATENT DOCUMENTS

| 7,003,295 | B1 * | 2/2006 | Cook et al. ............... 455/435.1 |
| 2001/0006546 | A1 * | 7/2001 | Jung ........................... 455/567 |
| 2001/0049275 | A1 * | 12/2001 | Pierry et al. ................. 455/414 |
| 2002/0123373 | A1 * | 9/2002 | Kirbas et al. ................ 455/567 |
| 2003/0054866 | A1 * | 3/2003 | Byers et al. ................. 455/567 |
| 2003/0115240 | A1 * | 6/2003 | Cho ........................... 709/102 |
| 2005/0085275 | A1 * | 4/2005 | Hugunin ..................... 455/567 |

* cited by examiner

*Primary Examiner*—John Lee
(74) *Attorney, Agent, or Firm*—The Law Offices of John C. Scott, LLC; John C. Scott

(57) ABSTRACT

A wireless silencing device transmits a wireless silence signal in or near a region where extraneous sound is undesired. Wireless devices in receipt of the wireless silence signal may use the signal to determine whether to enable an auto silence mode of operation.

19 Claims, 5 Drawing Sheets

METHOD AND APPARATUS TO AUTOMATICALLY SILENCE A MOBILE DEVICE

FIELD OF THE INVENTION

The invention relates generally to wireless communication and, more particularly, to control techniques for use with wireless devices.

DETAILED DESCRIPTION

Figure 1:
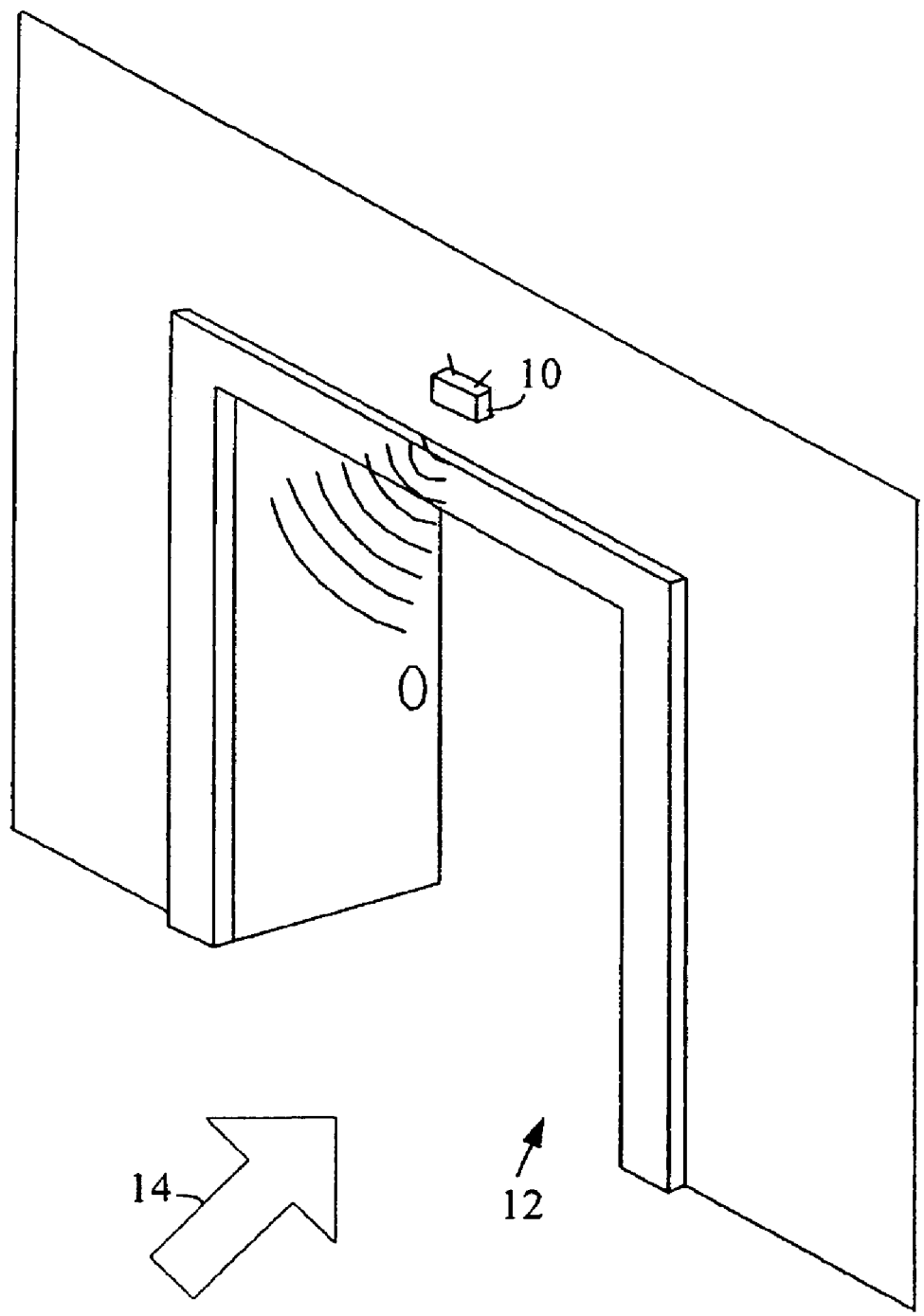
FIG. 1 is a diagram illustrating an example operational scenario for a wireless silencing device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The rapid growth of the wireless industry has made a wide variety of wireless devices available to consumers. Devices such as cellular telephones, pagers, personal digital assistants having wireless capability, laptop, palmtop, and tablet computers having wireless capability, satellite communicators, cameras having wireless capability, audio/video devices having wireless capability, and others have added to the convenience of everyday life for the public at large. Many of these wireless devices are capable of emitting audible signals. These audible signals may be emitted for various reasons including, for example, to provide a notification function (e.g., a cellular telephone may emit an audible signal to notify a user of an incoming call, a laptop computer may emit an audible signal to notify a user of an incoming email message, etc.), to act as a reminder (e.g., a laptop computer may have an alarm clock function which emits an audible signal at a preset time, a calendar function which emits an audible tone to remind a user of an upcoming meeting, etc.), to provide entertainment (e.g., a media player on a laptop computer or PDA, etc.), and/or for other reasons (e.g., a computer or PDA may play an introductory sound file when powered up, etc.). Such audible signals are typically a helpful or enjoyable part of the operation of a wireless device. However, in some circumstances, these audible signals may be unwelcome and a source of embarrassment. For example, in movie theaters, during theatrical productions, during conferences or seminars, in libraries or hospitals, during church services, and in many other situations, the sudden emission of an audible signal by a wireless device may be considered disruptive, rude, or annoying. In at least one aspect of the present invention, techniques and structures are provided that are capable of reducing the occurrence of such inappropriate audible signals from wireless devices.

FIG. 1 is a diagram illustrating an example operational scenario for a wireless silencing device 10 in accordance with an embodiment of the present invention. The wireless silencing device 10 transmits a wireless silence signal that may be detected by wireless devices in a vicinity thereof. As shown, the wireless silencing device 10 may be mounted near a portal 12 that leads into (and/or out of) an area where extraneous audible signals are undesirable. A wireless device associated with a user 14 traversing through the portal 12, if appropriately configured, can detect the wireless silence signal and determine whether to enter a silence mode of operation based thereon. During the silence mode of operation, the wireless device will emit no audible signals (or only certain non-disruptive audible signals). The wireless silencing device 10 may be mounted anywhere in the vicinity of (or within) the portal 12, as long as the coverage region of the silencing device 10 encompasses the area through which persons will need to traverse to enter the protected space. For larger portals, or for enclosed spaces having more than one portal, multiple wireless silencing devices 10 may be used. As used herein, the term "portal" refers to any limited area of entrance and/or exit from a predefined space and is not limited to conventional doorways, etc. In one possible form, the wireless silencing device 10 may be a separate modular unit that can be purchased and mounted by an end user in an appropriate location. In another possible form, the wireless silencing device may be a circuit that can be made a part of another structure within a portal region (e.g., a circuit card that can be installed within an entrance/exit sign, a metal detector, a fire alarm, etc.). Other implementation also exist.

Figure 2:
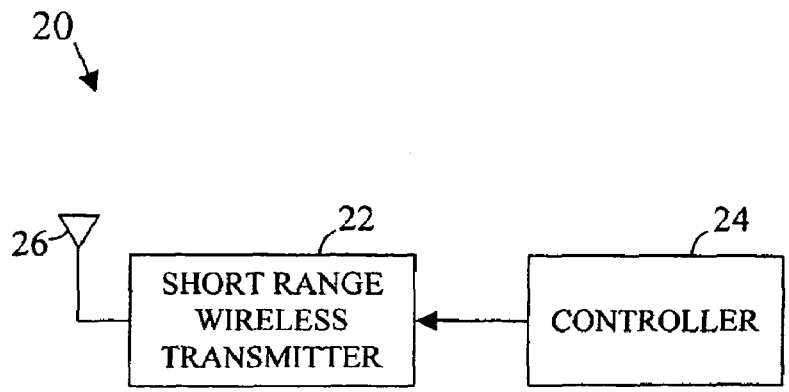
FIG. 2 is a block diagram illustrating an example wireless silencing device in accordance with an embodiment of the present invention.

FIG. 2 is a block diagram illustrating an example wireless silencing device 20 in accordance with an embodiment of the present invention. As illustrated, the wireless silencing device 20 may include: a short range wireless transmitter 22, a controller 24, and one or more antennas 26. The controller 24 generates the silence signals to be transmitted. The controller 24 delivers the silence signals to the short range wireless transmitter 22 which transmits the signals via antenna(s) 26. The silence signals may be transmitted continuously, at periodic intervals, at predetermined times, and/or in some other repetitive manner. The wireless silence signal may include any type of information that uniquely identifies the signal as a silence signal. In at least one embodiment, the short range wireless transmitter 22 and the controller 24 are mounted on a common substructure (e.g., a housing, a substrate, etc.). The substructure may have a fixture coupled thereto for use in attaching the wireless silencing device 20 to, for example, a wall, ceiling, door, doorframe, pole, or other structure in a portal region.

The wireless transmitter 22 is a "short range" transmitter because it is desirable to limit the reach of the wireless silence signals to a relatively small area about a corresponding portal. Longer range wireless transmitters may have the potential to inadvertently change wireless user devices to a silence mode of operation even when a corresponding user is not entering into an area where silence is desired (e.g., someone across the hall from a portal, etc.). In at least one embodiment, a short range wireless transmitter 22 is used that has a nominal range of 20 meters or less. The short range wireless transmitter 22 may be part of, for example, a short range wireless transceiver within the wireless silencing device 20. In at least one embodiment, the short range wireless transmitter 22 is configured in accordance with the Bluetooth wireless networking standard (Specification of the Bluetooth System, Version 1.2, Bluetooth SIG, Inc., November 2003, and related specifications). Other short range wireless standards may alternatively be used (e.g., IEEE 802.15.3, Ultrawideband, and/or others).

In at least one embodiment, a wireless silencing device having a wireless transmitter that is configured in accordance with a wireless standard that is not a short range standard (e.g., IEEE 802.11, etc.) is provided. In such an embodiment, the transmit power level of the wireless transmitter may be reduced from that specified within the non short range wireless standard to achieve a shorter range device (e.g. a device having an effective range of 20 meters or less).

Figure 3:
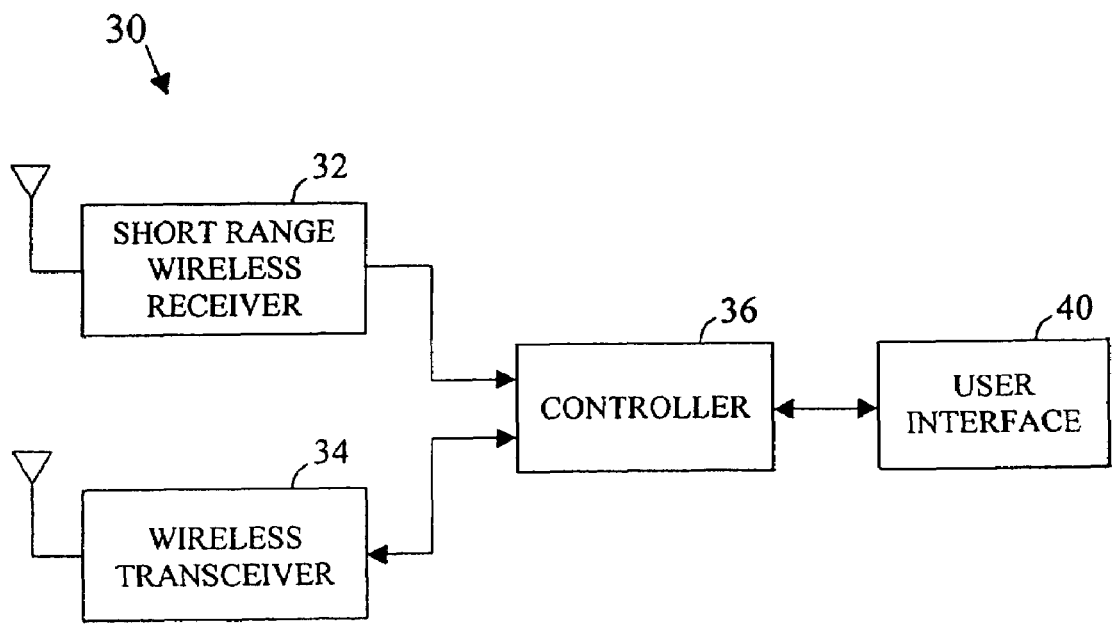
FIG. 3 is a block diagram illustrating an example wireless device in accordance with an embodiment of the present invention.

FIG. 3 is a block diagram illustrating an example wireless device 30 in accordance with an embodiment of the present invention. As illustrated, the wireless device 30 includes: a short range wireless receiver 32, a wireless transceiver 34, a controller 36, a user interface 40, one or more antennas 42 for use with the short range wireless receiver 32, and one or more antennas 44 for use with the wireless transceiver 34. The wireless transceiver 34 may be used to perform conventional wireless communication functions for a user of the wireless device 30. For example, the wireless transceiver 34 may be configured in accordance with one or more wireless networking standards (e.g., IEEE 802.11 and progeny, etc.) to allow the wireless device 30 to communicate within an associated network. Alternatively, or in addition, the wireless transceiver 34 may be configured in accordance with one or more wireless cellular standards (e.g., Global System for Mobile Communication (GSM), General Packet Radio Services (GPRS), Universal Mobile Telecommunications Service (UMTS), etc.) to allow the wireless device 30 to communicate within an associated cellular network. Other wireless standards may also (or alternatively) be used. In at least one embodiment, the wireless device 30 does not include the wireless transceiver 34. This may be the case, for example, in a camera or audio/video device that has short range wireless capability (e.g., Bluetooth, etc.), but no additional wireless capability.

The short range wireless receiver 32 is operative for, among other things, receiving wireless silence signals transmitted by a wireless silencing device (e.g., wireless silencing device 20 of FIG. 2). As such, the short range wireless receiver 32 will typically be configured in accordance with the same short range wireless standard that is used by a wireless transmitter within a corresponding wireless silencing device. In at least one embodiment, the short range wireless receiver 32 is configured in accordance with the Bluetooth wireless networking standard. Other short range wireless standards may alternatively be used. The controller 36 is operative for, among other things, processing any wireless silence signals received by the wireless device 30. The user interface 40 is operative for providing an interface between a user and the device 30. The user interface 40 may include structures such as, for example, a keyboard, a liquid crystal display (LCD), a speaker, a microphone, a vibration element, a mouse, a stylus, and/or any other form of device or structure that allows a user to input information or commands to the device 30 or receive information, notification, or responses from the device 30. As will be appreciated, the specific types of input/output devices that are used will depend upon the type of wireless device being implemented.

During operation of the wireless device 30, the controller 36 monitors the short range wireless receiver 32 to determine whether a wireless silence signal has been received. When a wireless silence signal is detected, the controller 36 may then make a decision as to whether to place the wireless device 30 into a silence mode of operation. During the silence mode of operation, the wireless device 30 will refrain from generating all (or most) audible signals. For functions that normally use sound as a notification technique (if any), the wireless device 30 may substitute a non-audible notification technique (e.g., vibration, illumination, etc.). Thus, a cellular telephone, for example, may vibrate when an incoming call is received, rather than ring, while in silence mode.

In at least one embodiment, the controller 36 places the wireless device 30 into silence mode every time a wireless silence signal is received. The user may then manually restore the wireless device 30 to normal (i.e., non-silence) mode when the device 30 is no longer in an area where extraneous sounds are to be avoided. A periodic reminder may be given to the user (e.g., vibration with a corresponding display message, etc.) to switch back to normal mode once silence mode has been initiated. In some other embodiments, the controller 36 may use the receipt of a silence signal as a toggle to switch the wireless device between silence mode and normal mode. In these embodiments, the decision as to whether to place the wireless device 30 into silence mode when a silence signal is received is more complex. For example, when a silence signal is received, the controller 36 may first determine whether the wireless device 30 is already in silence mode. If not, the controller 36 may place the wireless device 30 into silence mode. This may be the case when, for example, a user is first entering a "silence" area through a portal (e.g., portal 12 of FIG. 1). If the wireless device 30 is already in silence mode, on the other hand, the controller 36 may immediately place the wireless device 30 into normal mode when the silence signal is received. This may be the case when, for example, the user is exiting the "silence" area through the portal.

In one possible implementation, the user may be prompted to approve or disapprove of the switch back to normal mode. If the user disapproves of the switch, the controller 36 may keep the wireless device 30 in silence mode and resume monitoring the short range wireless receiver 32 for wireless silence signals. If the user does not disapprove of the switch within a predetermined time period after the prompt, the controller 36 may switch the wireless device to normal mode and resume monitoring the short range wireless receiver 32 for wireless silence signals. In at least one embodiment, the controller 36 may have a bypass feature that allows a user to manually bypass the automatic silencing functions described above. In addition, the controller 36 may also have a manual silence feature that allows a user to manually place the wireless device 30 into silence mode. When the wireless device 30 is in manual silence mode, the controller 36 may essentially ignore wireless silence signals.

In at least one embodiment of the invention, the short range wireless receiver 32 and the wireless transceiver 34 are implemented upon a common semiconductor chip. In some other embodiments, physically separate units may be used. The short range wireless receiver 32 may be part of a short range wireless transceiver (e.g., a Bluetooth transceiver). The short range wireless receiver 32 may also have other functions in addition to receiving wireless silence signals (e.g., typical Bluetooth functions, etc.). In at least one embodiment, the controller 36 is implemented within one or more digital processing devices (e.g., a general purpose microprocessor, a digital signal processor (DSP), a reduced instruction set computer (RISC), a field programmable gate array (FPGA), an application specific integrated circuit (ASIC), and/or others). The auto silence features may be implemented within the controller using, for example, a software subroutine, object, program, or module that is set up to automatically load at device power up. Other arrangements may alternatively be used.

As described previously, in at least one implementation, the wireless transmitter within a wireless silencing device may be configured in accordance with a longer range wireless standard, but have its transmitter power reduced to limit the range thereof. In such a scenario, the wireless device 30 of FIG. 3 may dispense with the short range wireless receiver 32 and simply use the wireless transceiver 34 to receive the wireless silence signals (assuming it is configured for the appropriate standard).

Figure 4:
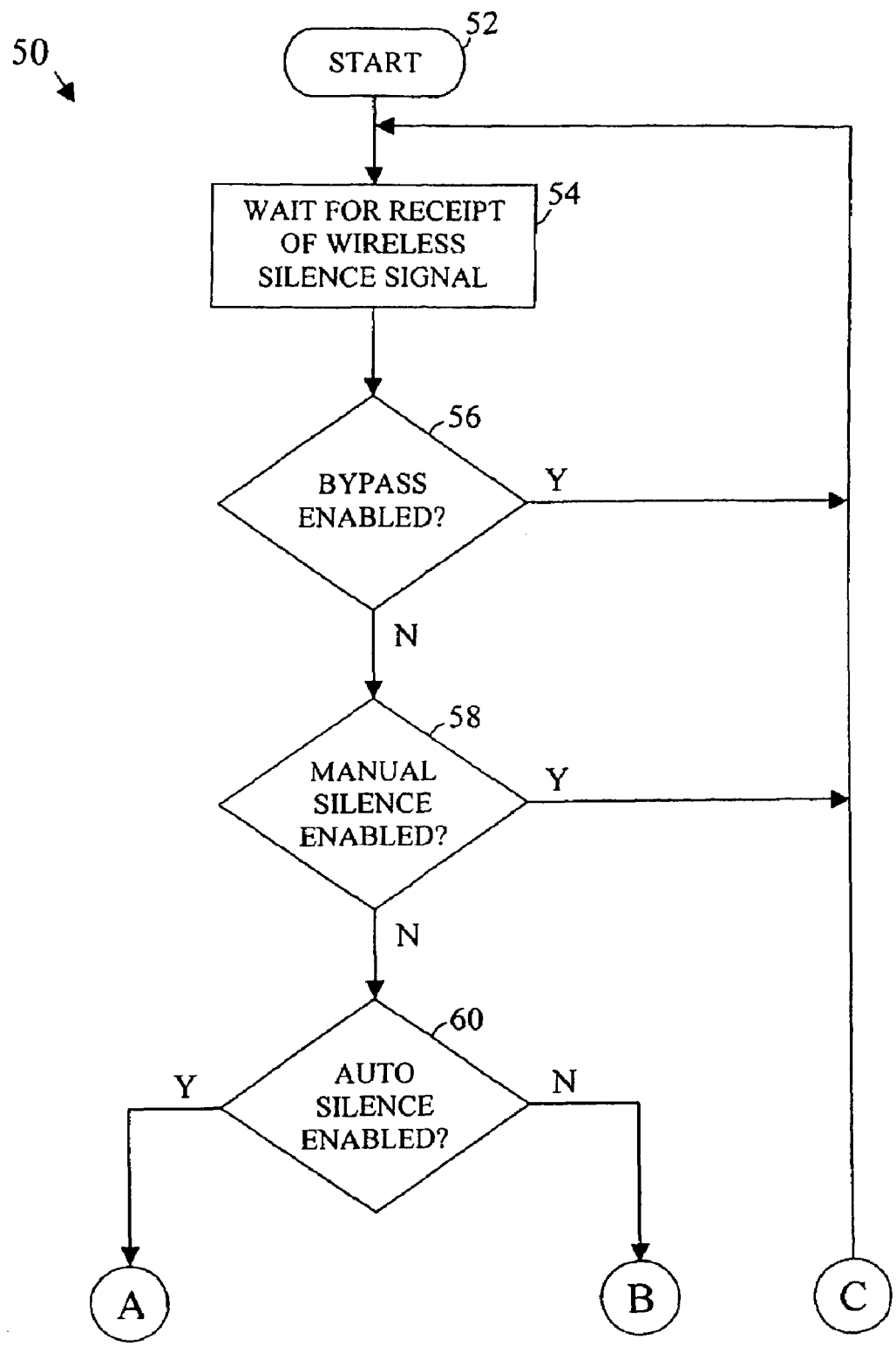
FIGS. 4 and 5 are portions of a flowchart illustrating a method for use in operating a wireless device in accordance with an embodiment of the present invention.
Figure 5:
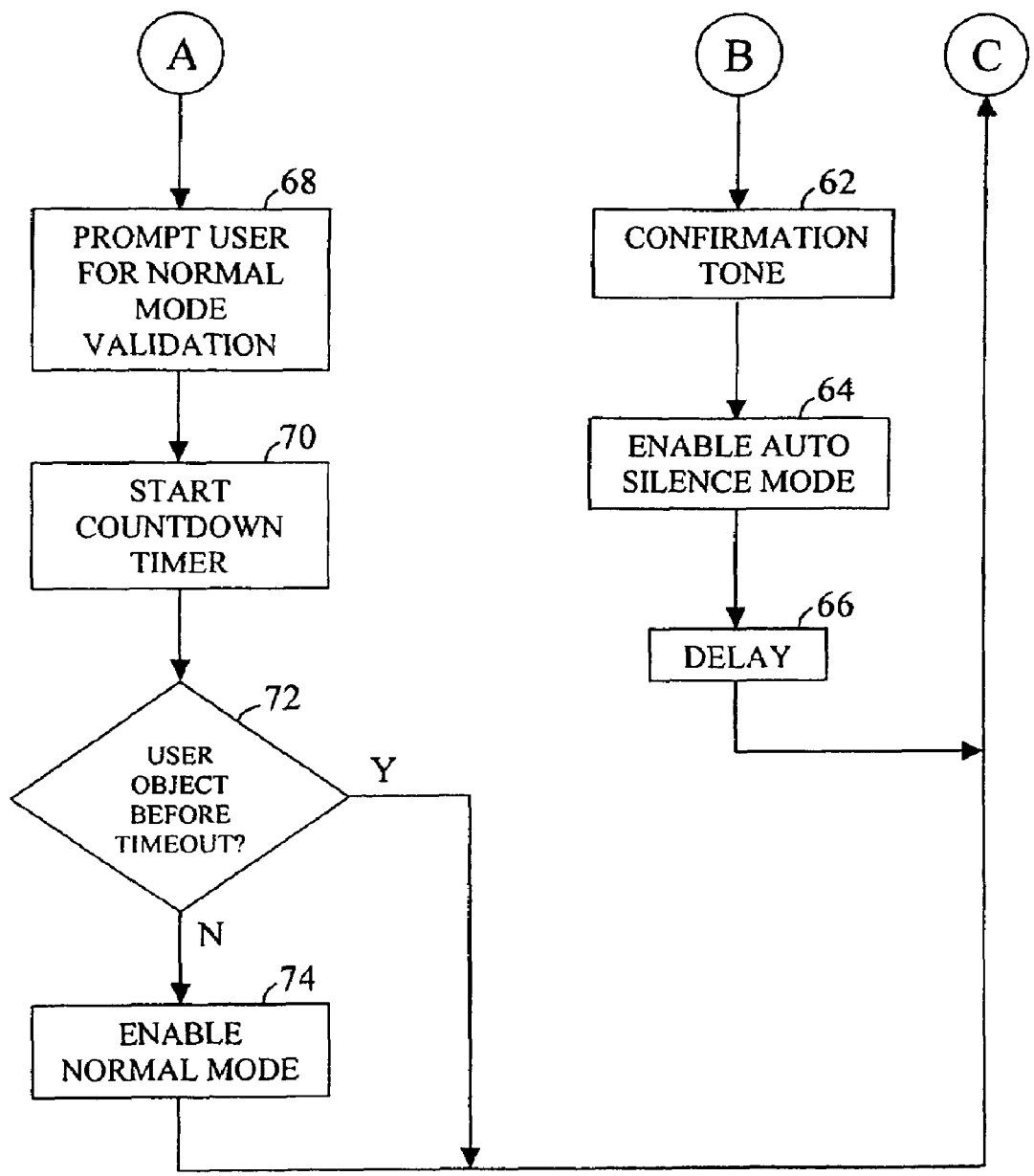

FIGS. 4 and 5 are portions of a flowchart illustrating a method 50 for use in operating a wireless device in accordance with an embodiment of the present invention. The method 50 begins in block 52. The method 50 may start, for example, when the corresponding wireless device is first powered up. Other start up techniques may alternatively be used. The wireless device first waits for a wireless silence signal to be received (block 54). When a wireless silence signal is detected, it may then be determined whether to enable the auto silence mode. It may first be determined whether a bypass function has been enabled within the wireless device (block 56). The bypass function is a function that allows a user to manually bypass (i.e., not use) the auto silencing features of the wireless device. A user may enable the bypass function during, for example, a device programming operation. If the bypass function has been enabled, the method 50 may return to block 54 and once again wait for a wireless silence signal to be received. If the bypass function has not been enabled, it may next be determined whether a "manual" silence mode has been enabled (block 58). The manual silence mode allows a user to manually place the wireless device in silence mode. Like the bypass function, the user may enable the manual silence mode during a device programming operation. The bypass function and the manual silence mode are both optional features. If it is determined that the manual silence mode is presently enabled (block 58-Y), then the method 50 may return to block 54 and again wait for a wireless silence signal to be received.

If the manual silence mode is not presently enabled (block 58-N), the method 50 may then determine whether the auto-silence mode is presently enabled (block 60). Auto-silence mode is a silence mode that a wireless device may be placed in automatically in response to a wireless silence signal. For example, when a user first walks through a portal having a wireless silencing device, the user's wireless device may automatically enable the auto-silence mode. When the user later leaves through the same portal, the wireless device may automatically switch back to normal mode. By determining whether auto silence mode is currently enabled, the method 50 may thus determine what the next action should be.

Referring now to FIG. 5, if it is determined (in block 60) that auto silence mode is not currently enabled, a confirmation tone may first be delivered to the user (block 62) and then auto silence mode may be enabled (block 64). The method 50 may then return to block 54 and once again wait for a wireless silence signal to be received. A small delay 66 may be used before returning to block 54 to give the user time to fully traverse through the portal area and thus prevent the immediate receipt of another wireless silence signal. If it is determined (in block 60) that auto silence mode is currently enabled, the user may then be prompted to determine whether he/she objects to switching back to normal mode (block 68). The prompt may include, for example, vibration of the wireless device (and/or a short tone) along with a display message. If a tone is used, it may be a different tone from that used as the auto silence mode confirmation tone (e.g., two beeps instead of three, etc.). Other prompting techniques may alternatively be used. A countdown timer (or other timing unit) may be initiated at about the time of the prompt (block 70). If a user objection is received before the timer times out, then the method 50 may immediately return to block 54 and wait for a next wireless silence signal to be received (i.e., the wireless device will remain in auto silence mode). If the user fails to object to the switch before timeout (or if the user approves of the switch before timeout), then the wireless device may switch to normal mode before returning to block 54.

Figure 6:
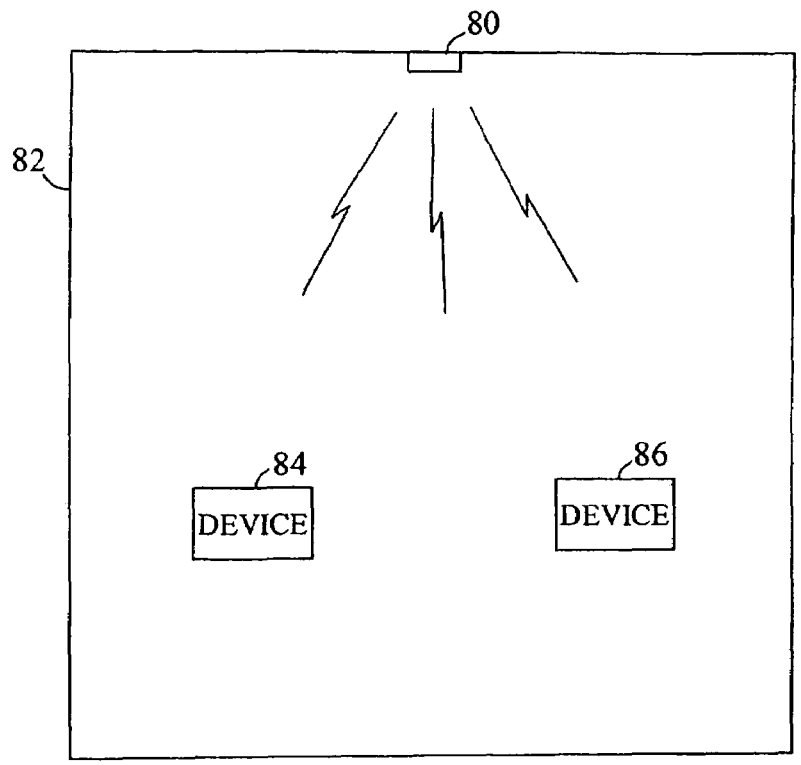
FIG. 6 is a diagram illustrating another example operational scenario for a wireless silencing device in accordance with an embodiment of the present invention.

FIG. 6 is a diagram illustrating an operational scenario for a wireless silencing device 80 in accordance with another embodiment of the present invention. In this scenario, the wireless silencing device 80 is mounted within a room 82 (or other predefined space) where extraneous sounds are to be avoided. As shown, a number of wireless devices 84, 86 may also be located within the room 82. The wireless silencing device 80 may be configured to repeatedly (e.g., periodically, continuously, from time to time, etc.) transmit a wireless silence signal within the room 82. As before, short range wireless technology may be used (e.g., Bluetooth, etc.). The wireless devices 84, 86 may be programmed to remain in silence mode as long as wireless silence signals are being received. When wireless silence signals are no longer being received, the wireless devices 84, 86 may automatically switch back to a normal mode of operation. It may be desirable that the wireless silencing device 80 cover just the area where extraneous sounds are undesirable, and not extend outside of this area (e.g., not extend outside the walls of room 82, etc.). Appropriate adjustments may be made during installation of the silencing device 80 to so limit the coverage region thereof (e.g., mounting location, orientation, transmit power, antenna, and/or other adjustments may be made). For larger areas, multiple wireless silencing devices 80 may be used.

Figure 7:
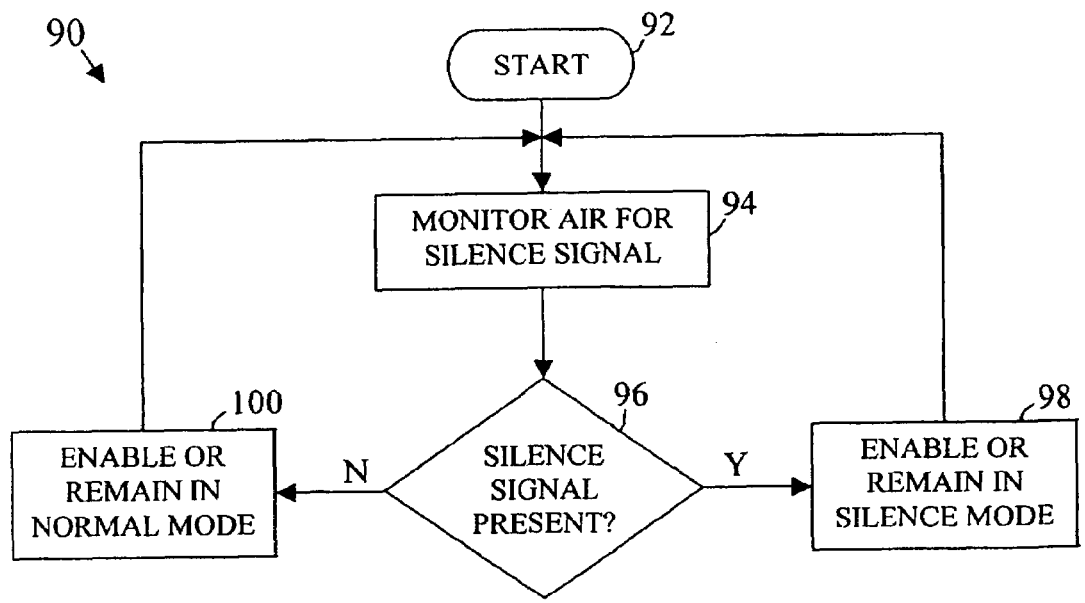
FIG. 7 is a flowchart illustrating a method for use in operating a wireless device in accordance with an embodiment of the present invention.

FIG. 7 is a flowchart illustrating a method 90 for use in operating a wireless device in accordance with an embodiment of the present invention. The method 90 may be implemented in connection with, for example, the wireless devices 84, 86 of FIG. 6. The method 90 starts at block 92. As before, the method 90 may initiate at the time a wireless device is first powered up, although other initiation techniques (e.g., manual user initiation, etc.) may alternatively be used. A wireless device monitors a surrounding environment for a wireless silence signal (block 94). When a silence signal is determined to be present (block 96-Y), the wireless device may either enable the silence mode (if silence mode is not presently enabled) or remain in silence mode (if silence mode is presently enabled) (block 98). The method 90 may then resume monitoring the surrounding environment (block 94). When it is determined that a silence signal is not currently present (block 96-N), the wireless device may either enable a normal mode (if normal mode is not presently enabled) or remain in normal mode (if normal mode is presently enabled) (block 100). The method 90 may then resume monitoring the surrounding environment (block 94). As in the method 50 of FIGS. 4 and 5, a bypass function and/or a manual silence mode may be incorporated into the method 90. Also, in at least one embodiment, a normal mode user validation prompt may be used (as illustrated in FIG. 5) when the absence of a silence signal is first detected. Other modifications and variations may also be made.

The techniques and structures of the present invention may be implemented in any of a variety of different forms. For example, features of the invention may be embodied within cellular telephones and other handheld wireless communicators, personal digital assistants having wireless capability, laptop, palmtop, and tablet computers having wireless capability, pagers, satellite communicators, cameras having wireless capability, audio/video devices having wireless capability, network interface cards (NICs) and other network interface structures, integrated circuits, as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a wireless receiver that is configured in accordance with a first wireless standard;
a wireless transceiver that is configured in accordance with a second wireless standard, said second wireless standard being different from said first wireless standard; and
a controller coupled to said wireless receiver and said wireless transceiver, said controller being programmed to: (a) monitor signals received by said wireless receiver to detect a silence signal, said silence signal including information that uniquely identifies said signal, (b) when said silence signal is detected and said apparatus is not already in a silence mode of operation, switch said apparatus to said silence mode of operation, and (c) when said silence signal is detected and said apparatus is already in said silence mode of operation, (i) prompt a user to determine whether the user objects to entry into a normal mode of operation, and (ii) enable the normal mode of operation when no user objection is received within a predetermined amount of time after said prompt.

2. The apparatus of claim 1, wherein:
said controller is programmed to perform one or more user notification functions; and
said controller is programmed to use a silent notification technique to perform said one or more user notification functions when said apparatus is in said silence mode of operation.

3. The apparatus of claim 2, wherein:
said silent notification technique includes vibration.

4. The apparatus of claim 2, wherein:
said silent notification technique includes illumination.

5. The apparatus of claim 1, wherein:
said wireless receiver is part of a short range wireless transceiver.

6. The apparatus of claim 1, wherein:
said wireless receiver is configured in accordance with the Bluetooth wireless networking standard.

7. The apparatus of claim 1, wherein:
said wireless receiver and said wireless transceiver are implemented on a common semiconductor chip.

8. A method comprising:
waiting for receipt of a wireless silence signal at a wireless device, said wireless silence signal including information that uniquely identifies said signal; and
when said a wireless silence signal is detected, determining whether to enable an auto-silence mode for the wireless device, wherein determining whether to enable said an auto-silence mode includes: (a) determining whether auto-silence mode is already enabled, and (b) when auto-silence mode is already enabled, (i) prompting a user to determine whether the user objects to entry into a normal mode of operation, and (ii) enabling the normal mode of operation when no user objection is received within a predetermined amount of time after said prompting.

9. The method of claim 8, wherein:
determining whether to enable an auto-silence mode includes determining whether a bypass function is enabled, wherein said bypass function is a function that a user can set to disable automatic silencing.

10. The method of claim 8, wherein:
determining whether to enable an auto-silence mode includes determining whether a manual silence mode is enabled.

11. The method of claim 8, wherein:
determining whether to enable an auto-silence mode includes enabling said auto silence mode when a determination is made that auto-silence mode is not already enabled.

12. The method of claim 11, further comprising:
waiting for receipt of another wireless silence signal after enabling said auto-silence mode.

13. The method of claim 8, further comprising:
when a user objection is received within a predetermined amount of time after prompting, waiting for receipt of another wireless silence signal.

14. A system comprising:
at least one dipole antenna;
a wireless receiver, coupled to said at least one dipole antenna, that is configured in accordance with a first wireless standard;
a wireless transceiver that is configured in accordance with a second wireless standard, said second wireless standard being different from said first wireless standard; and
a controller coupled to said wireless receiver and said wireless transceiver, said controller being programmed to:

(a) monitor signals received by said wireless receiver to detect a silence signal, said silence signal including information that uniquely identifies said signal, (b) when said silence signal is detected and said apparatus is not already in a silence mode of operation, switch said apparatus to said silence mode of operation, and (c) when said silence signal is detected and said apparatus is already in said silence mode of operation, (i) prompt a user to determine whether the user objects to entry into a normal mode of operation, and (ii) enable the normal mode of operation when no user objection is received within a predetermined amount of time after said prompt.

15. The system of claim 14, wherein:
said wireless receiver is part of a short range wireless transceiver.

16. The system of claim 14, wherein:
said wireless receiver is configured in accordance with the Bluetooth wireless networking standard.

17. A computer readable medium encoded with computer executable instructions that, when executed by a computing platform, operate to:

wait for receipt of a wireless silence signal at a wireless device, said wireless silence signal including information that uniquely identifies said signal; and when said wireless silence signal is detected, determine whether to enable an auto-silence mode of the wireless device, wherein said determination of whether to enable said auto-silence mode includes operation to: (a) determine whether said auto-silence mode is already enabled, and (b) when said auto-silence mode is already enabled, (i) prompt a user to determine whether the user objects to entry into a normal mode of operation, and (ii) enable the normal mode of operation when no user objection is received within a predetermined amount of time after said prompting.

18. The computer readable medium of claim 17, wherein:
determining whether to enable an auto-silence mode includes determining whether a bypass function is enabled, wherein said bypass function is a function that a user can set to disable automatic silencing.

19. The computer readable medium of claim 18, wherein:
determining whether to enable an auto-silence mode includes determining whether a manual silence mode is enabled.

* * * * *

UNITED STATES PATENT AND TRADEMARK OFFICE
CERTIFICATE OF CORRECTION

PATENT NO.        : 7,630,723 B2                                            Page 1 of 1
APPLICATION NO. : 10/915292
DATED             : December 8, 2009
INVENTOR(S)       : Jose J Araya Vargas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1483 days.

Signed and Sealed this

Twenty-first Day of December, 2010

David J. Kappos
*Director of the United States Patent and Trademark Office*